United States Patent [19]

Day, V et al.

[11] Patent Number: 4,726,175
[45] Date of Patent: Feb. 23, 1988

[54] HARVESTER GUIDANCE CONTROL SYSTEM

[75] Inventors: George B. Day, V; Timothy D. Smith, both of Lexington, Ky.

[73] Assignee: University of Kentucky Research Foundation, Lexington, Ky.

[21] Appl. No.: 9,950

[22] Filed: Feb. 2, 1987

[51] Int. Cl.$^4$ .................. A01B 63/00; B62D 15/02
[52] U.S. Cl. .................. 56/10.2; 56/DIG. 15; 172/5; 172/6; 180/79.1; 280/776
[58] Field of Search .................. 56/10.2, DIG. 15; 172/5, 6, 26; 180/79.1; 280/776

[56] References Cited

U.S. PATENT DOCUMENTS

| | | | |
|---|---|---|---|
| 3,946,825 | 3/1976 | Gail | 56/10.2 |
| 3,952,828 | 4/1976 | Stampter et al. | 56/10.2 |
| 4,126,984 | 11/1978 | Gail | 56/10.2 |
| 4,166,349 | 9/1979 | Coenenberg | 56/10.2 |
| 4,295,323 | 10/1981 | Maier et al. | 56/10.2 |
| 4,367,621 | 1/1983 | Swetnam et al. | |
| 4,470,242 | 9/1984 | Swetnam et al. | 56/10.2 |
| 4,505,094 | 3/1985 | Deworest | 56/10.2 |
| 4,528,804 | 7/1985 | Williams | 56/10.2 |
| 4,663,918 | 5/1987 | Williams et al. | 56/10.2 |

FOREIGN PATENT DOCUMENTS

| | | | |
|---|---|---|---|
| 2145717 | 3/1973 | Fed. Rep. of Germany | 56/10.2 |
| 2362899 | 6/1975 | Fed. Rep. of Germany | 56/10.2 |
| 1202490 | 8/1970 | United Kingdom | 56/DIG. 15 |

Primary Examiner—John Weiss
Attorney, Agent, or Firm—King and Schickli

[57] ABSTRACT

A guidance control system for a harvester or like machinery includes a steering linkage operatively connected to at least one ground engaging wheel. Harvester steering is controlled through the linkage by either an operator controlled steering wheel or a sensor responsive self-steering mechanism. The sensor responsive self-steering mechanism includes a guide assembly pivotally mounted to the harvester. The guide assembly includes a pair of laterally spaced, cooperating tines that define a path therebetween for plants being harvested. A sensor positioned on each tine senses the position of plants as they are harvested. A control circuit is responsive to the sensors to selectively impart movement to the steering linkage to self-steer the harvester. The control circuit includes a main valve controlled by the operator controlled steering wheel and a secondary valve controlled by the sensors. An auxiliary feed line leads from the main valve to the secondary valve. When the operator utilizes the steering wheel control, an interrupter blocks hydraulic flow through the auxiliary line from the main valve to the secondary valve. Thus, operator controlled steering input overrides the sensor responsive self-steering for maximum safety. The guidance control system also eliminates harvester wander back and forth across a row by substantially preventing overcompensation by the sensor responsive self-steering.

13 Claims, 3 Drawing Figures

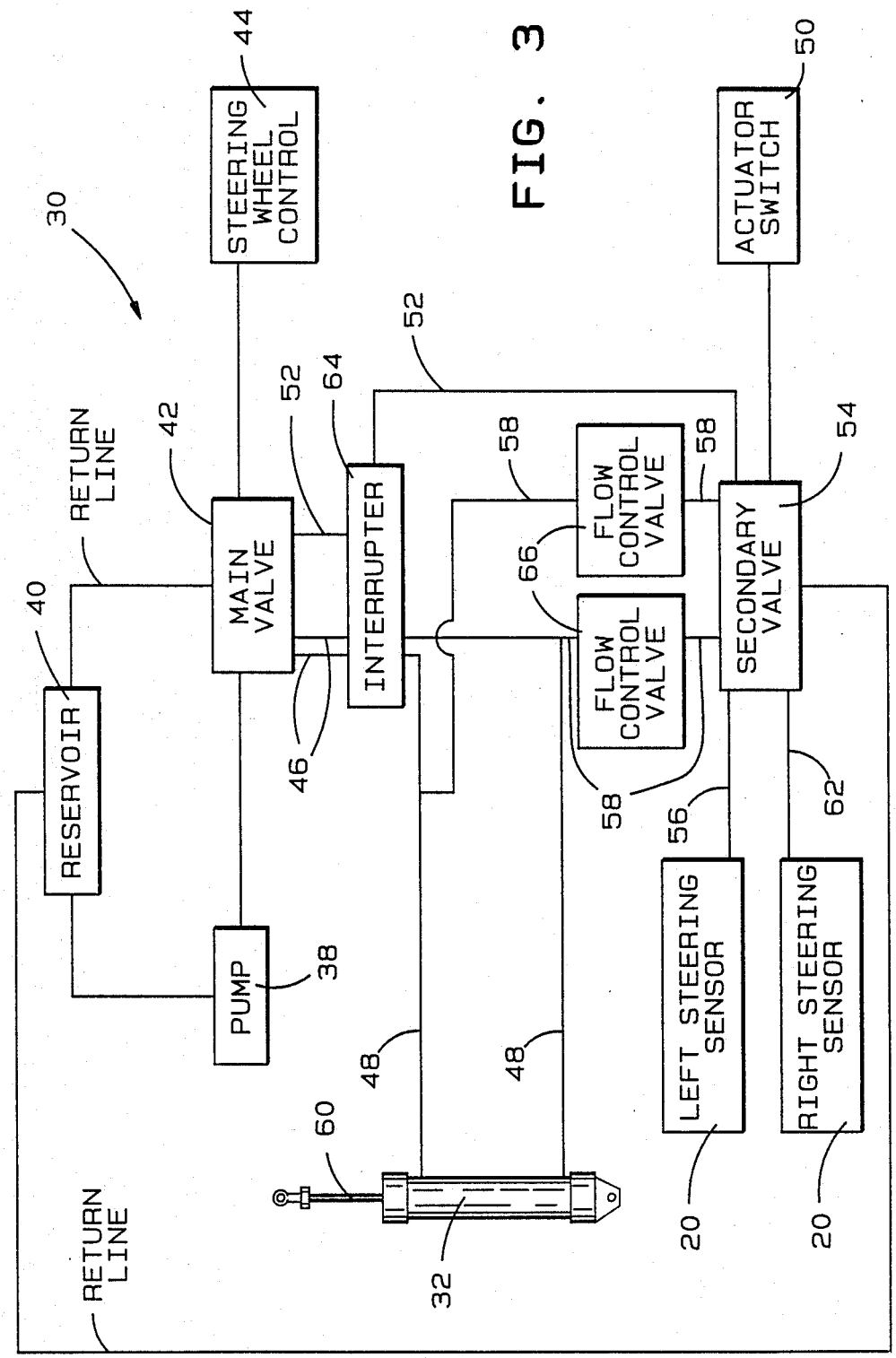

HARVESTER GUIDANCE CONTROL SYSTEM

TECHNICAL FIELD

The present invention relates generally to the harvesting of plants and, more particularly, to an improved guidance control system for a harvester.

BACKGROUND OF THE INVENTION

A number of harvesting machines have been developed utilizing a guidance control or self-steering system that maintains the machine in proper position as it proceeds along a row of plants being harvested. An example of a harvester incorporating a conventional self-steering system is shown in U.S. Pat. No. 4,367,621 to Swetnam et al.

The self-steering system disclosed in the Swetnam et al. patent includes a pair of laterally spaced, outwardly projecting guiding sensors. These sensors sense the presence and/or position of the plants being harvested. More specifically, as the guiding sensors engage the plants steering correction forces are transmitted through a connecting rod to impart movement to the steering crank arm so as to steer the wheels of the harvester. In this way, the harvester is maintained in proper harvesting position as it travels along the entire length of the crop row. Advantageously, the resulting self-steering action frees the harvester operator for other tasks thereby improving overall labor efficiency.

While the self-steering system disclosed in the Swetnam et al. patent provides effective guidance of the harvester along a row, it is not without its disadvantages and may, therefore, be subject to improvement. For example, under certain circumstances steering correction forces may be produced that overcompensate causing the harvester to wander back and forth across the row more than desired. A need is, therefore, identified for a self-steering or guidance control system that is more efficient, providing smoother, (more rapid) response and substantially eliminating wander.

SUMMARY OF THE INVENTION

Accordingly, it is a primary object of the present invention to provide a guidance control system for a harvester or other like machinery furnishing improved operating efficiency while having a relatively simple construction to reduce manufacturing costs.

Another object of the present invention is to provide a guidance control system furnishing efficient self-steering action while also allowing immediate override by the operator for added safety.

An additional object of the present invention is to provide a guidance control system for self-steering heavy machinery with relatively low input forces.

Yet another object of the present invention is the provision of a guidance control system that reduces wander by substantially eliminating overcompensation so as to provide smoother, (faster), more accurate self-steering response.

To achieve the foregoing and other objects, and in accordance with the purposes of the present invention as described herein, an improved guidance control system is provided for a harvester or other machinery. The guidance control system is operative to maintain the harvester in proper harvesting position and alignment as the harvester travels along a row of plants in a field.

The guidance control system includes a steering linkage that is mounted to the harvester and connected to at least one ground engaging wheel. An operator controlled steering mechanism, such as a steering wheel, is provided for steering the harvester onto a row. Once positioned, on a row for harvesting, the guidance control system provides self-steering action for more effective and efficient trouble-free harvesting.

More specifically, a guide assembly is also mounted to the harvester. The guide assembly includes a pair of laterally-spaced, cooperating tines. These tines are positioned on the harvester so that plants being harvested pass between the tines.

The guide assembly also includes sensors for sensing the position of plants in the row as they are harvested. A control circuit on the harvester is responsive to the sensors so as to selectively impart movement to the steering linkage and steer the harvester along the row without the need for operator input. Thus, the harvester operator may advantageously perform other functions as the harvester moves along a crop row.

Preferably, a sensor including a spring loaded feeler element is pivotally mounted to each tine. Each feeler element is displaceable between a rest position and a steering adjustment actuating position when engaged by a plant being harvested. A switch means, such as a microswitch, is mounted to each tine in association with each feeler element. Thus, when the harvester begins to move too far to the right along the row of plants being harvested the feeler element on the left tine engages a plant. As the left feeler element is displaced to the steering adjustment actuating position, the switch associated with the left feeler element is closed. A signal is then sent through the control circuit to cause the harvester to steer back to the left so as to return to proper harvesting position as the harvester continues along the row.

An identical series of events occurs when the harvester begins to move too far to the left of the row of plants being harvested. In this instance, the feeler element on the right tine engages a plant and is displaced into the steering adjustment actuating position. A switch associated with the right feeler element is closed and a signal is sent along the control circuit to steer the harvester to the right and return the harvester to proper harvesting position.

A steering actuator is provided for driving the steering linkage. The control circuit connected to the steering actuator includes a main valve responsive to the operator control steering wheel and a secondary valve responsive to the sensors on the guide assembly.

An auxiliary feed port leads from the main valve to the secondary valve. When the steering wheel is operated by the harvester driver, an interrupter blocks flow through the auxiliary port thus preventing steering control through the sensors. As a consequence, substantially immediate override of the self-steering mechanism is provided. Thus, the guidance control system of the present invention provides fully automated performance with maximum operator safety through immediate override capability.

Main feed lines connect the main valve to the steering actuator. When the sensor responsive self steering is being utilized, the interrupter blocks the flow through these main feed lines. Secondary feed lines connect the secondary valve to the steering actuator. Metering valves are provided in the secondary feed lines for adjusting the sensitivity of the sensor responsive steering. Advantageously, by providing the sensitivity adjustment through the metering valves, full operating power may always be applied to the solenoid of the secondary valve so as to prevent any possibility of the valve sticking and thereby delaying steering correction. This results in far more reliable and consistent self steering operation.

Harvester wander back and forth across the row of plants being harvested is dramatically reduced by substantially preventing overcompensation of the sensor responsive steering. In order to achieve this result, the guide assembly is pivotally mounted to the harvester. Means such as a tie rod assembly are provided for connecting the guide assembly to the steering linkage. Thus, when the ground engaging wheel is turned through operation of the sensor responsive steering, the guide assembly is also turned in the same direction so as to pivot the sensor or feeler element being engaged by the plant away from the plant.

By pivoting the feeler element away from the plant, the feeler element is more rapidly released from engagement with the plant and is biased so as to return to the rest position. The switch associated with this feeler element is then opened and further additional turning of the harvester in the direction of the row crop is prohibited. It should be recognized, however, that sufficient guidance correction has been completed at this time to bring the harvester back into proper line and (substantially only) overcompensation is eliminated.

Preferably, the tie rod assembly includes a slip rod and a hollow tube member that is slidably received over the distal end of the slip rod. The tie rod assembly is biased in both tension and compression by means of a spring. The spring is fixed to the proximal end of the slip rod and the end of the hollow tube member received over the slip rod. Advantageously, this spring assures proper operation of the sensors and the closing of the switches by the feeler elements when engaged by a plant as described in greater detail below.

Still other objects of the present invention will be readily apparent to those skilled in this art from the following description wherein is shown and described the preferred embodiment of this invention simply by way of illustration of one of the modes best suited to carry out the invention. As will be realized, the invention is capable of other different embodiments, and its several details are capable of modifications in various, obvious aspects all without departing from the invention. Accordingly, the drawing and descriptions will be regarded as illustrative in nature and not as restrictive.

BRIEF DESCRIPTION OF THE DRAWING

The accompanying drawing incorporated in and forming a part of the specification, illustrates several aspects of the present invention, and together with the description serves to explain the principles of the invention. In the drawings:

FIG. 3 is a schematic diagram of the control circuit of the present invention.

Reference will now be made in detail to the present preferred embodiment of the invention, an example of which is illustrated in the accompanying drawing.

DETAILED DESCRIPTION OF THE INVENTION

Figure 1:
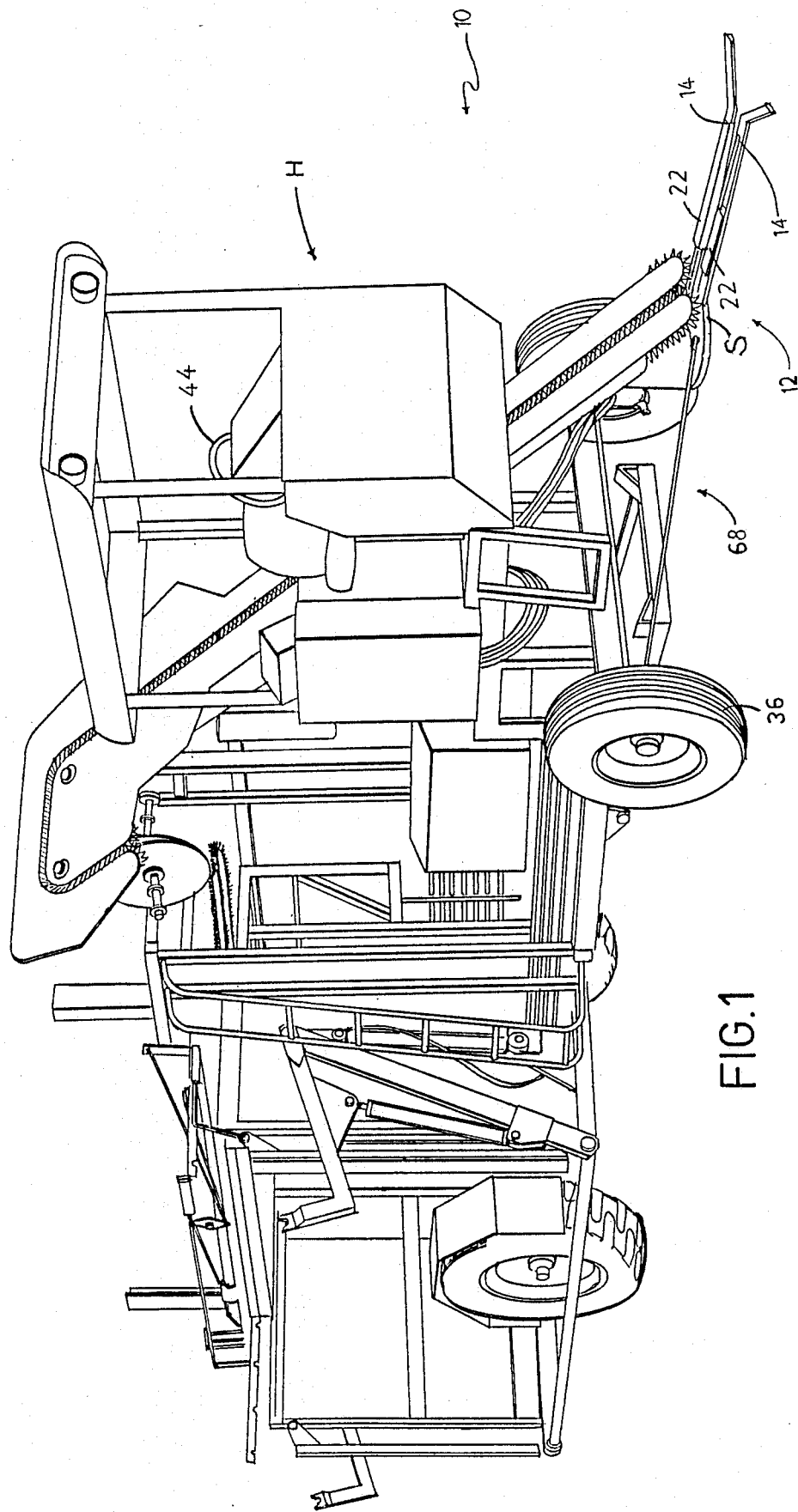
FIG. 1 is a perspective view of a harvester including the guidance control system of the invention.

Reference is now made to FIG. 1 showing tobacco harvester H as described in our copending patent application, Ser. No. 07/010176, filed Feb. 2, 1987, entitled Apparatus and Method for Automated Tobacco Harvesting being incorporated herein by reference. The tobacco harvester H includes the guidance control system 10 of the present invention. The guidance control system 10 is operative to maintain the harvester H in proper alignment for harvesting plants as the harvester travels along a row. While the present invention is being described for utilization on a tobacco harvester H, it should be appreciated, however, that it may also be adapted for utilization on any number of like machines as are known in the art.

Figure 2:
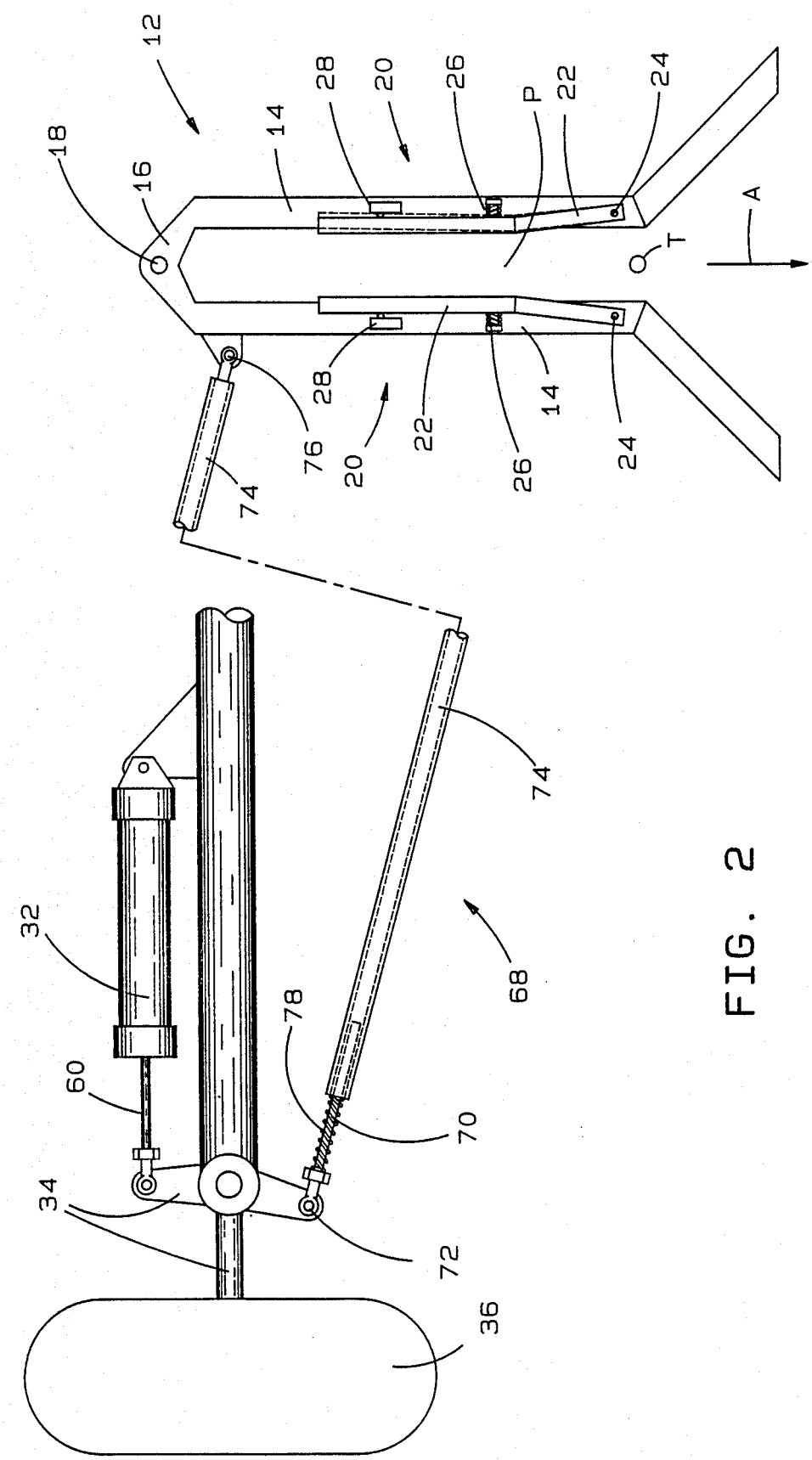
FIG. 2 is a schematical broken-away top plan view of the steering linkage and guide assembly of the present invention.

The guidance control system 10 includes a guide assembly 12. As best shown in FIG. 2, the guide assembly 12 includes a pair of laterally spaced, cooperating tines 14. A plant receiving path P is defined between the tines 14. The tines 14 are mounted to a yoke 16. The yoke 16 includes an aperture 18 allowing pivotal mounting of the guide assembly 12 to the harvester H. More specifically, the journal 16 extends rearwardly of the tines 14 for connection to the harvester H behind the circular cutting saw S (see also FIG. 1). The saw S severs the plant stalks passing between the tines 14 near the ground and a conveyor C receives and raises the severed plants from the ground for subsequent delivery to a portable frame for curing.

A sensor, generally designated by reference numeral 20, is mounted to each tine 14. Each sensor 20 senses the position of the plants passing through the plant receiving path P as they are being harvested. The sensors 20 each include a feeler element 22 pivotally mounted to the tine 14 by means of a pin 24. As shown, each feeler element 22 is biased inwardly along the plant receiving path P to a rest position (shown in full line in FIG. 2) by means of a spring 26.

When both feeler elements 22 are in the rest position, microswitches 28 mounted to each tine 14 and associated with each feeler element remain open. As long as each microswitch 28 remains open, no steering correction is imparted to the harvester H. Thus, the harvester H continues to advance along the row in the direction of action arrow A with plant stalks T passing freely between the tines 14 to the circular saw S.

A control circuit, generally designated by reference numeral 30 and shown in FIG. 3, is responsive to the sensors 20 to steer the harvester H. The circuit 30 includes a hydraulic cylinder or steering actuator 32 for driving the steering linkage 34 and directing or turning the front wheels 36 of the harvester H (see also FIGS. 1 and 2).

A pump 38 pumps hydraulic fluid from the reservoir 40 to a main valve 42. Operation of the main valve 42 is controlled by the harvester operator through the steering wheel 44. As the steering wheel 44 is turned by the operator to drive the harvester H onto a row, hydraulic fluid is directed through lines 46 and 48 to the steering actuator 32 so as to provide steering control.

Once the harvester H is aligned parallel to a row with the tines 14 extending on opposite sides of the end plant of the row, the actuator switch 50 may be activated to initiate the sensor responsive self steering operation.

At this time, the steering wheel control 44 is no longer utilized by the operator and hydraulic fluid is directed from the main valve 42 through the auxiliary line 52 to the secondary valve 54.

Operation of the secondary valve 54 is controlled by the left and right steering sensors 20 on the tines 14. If the harvester H begins drifting to the right or the plant row turns to the left as may occur in contour farming, the stalks T of the plants passing between the tines 14 engage the left feeler element 22. When engaged by a stalk T, the left feeler element 22 is displaced to the steering adjustment actuating position (see dashed lines in FIG. 2). In this position the associated microswitch 28 is closed and a signal is sent along the line 56 to the secondary valve 54.

The secondary valve 54 responds to this signal by directing hydraulic liquid flow along the lines 58 and 48 to the steering cylinder 32. More specifically, the flow causes the piston rod 60 to extend and thereby turn the front wheels 36 of the harvester H to the left. As the harvester H moves to the left and again becomes properly aligned with the plant row, the plant stalks T being harvested again pass through the path P between the tines 14 without engaging either feeler element 20. When this occurs, the spring 26 biases the left feeler element 22 back to its original, rest position thereby reopening the associated microswitch 28. With both microswitches 28 now open, no further steering corrections are initiated.

Conversely, it should be appreciated that when the harvester drifts to the left of the plant row or the plant row turns to the right, the stalks T of the plants being harvested engage the right feeler element 22. This closes the associated microswitch 28 causing a steering correction signal to be transmitted along the line 62 to the secondary valve 54. Hydraulic flow is then directed from the secondary valve 54 along the lines 58 and 48 to the steering cylinder 32 as required to cause the piston rod 60 to be retracted and the harvester H to turn to the right.

Once the harvester H is again properly aligned with the row, the right feeler element 22 no longer engages plant stalks T passing through the path P and returns to the rest position. As a result, the associated microswitch 28 also reopens and no further steering corrections are made until either feeler element 22 is again engaged by a stalk T.

As shown, the control circuit 30 also includes an interrupter 64. When the sensor responsive steering is operating and the steering wheel 44 is not being utilized by the operator, the interrupter 64 blocks the flow of hydraulic flow along the lines 46 to the main valve 42. The trapped fluid in the line 46 then acts as a check to ensure that fluid flow through the secondary valve 54 travels along the lines 58 and 48 directly to the steering cylinder 32.

When the sensor responsive steering is engaged and the harvester operator finds it necessary to suddenly steer from the plant row as, for example, to avoid hitting a co-worker, the operator need only utilize the steering wheel control 44. When the steering wheel control 44 is turned by the operator, hydraulic fluid flow is directed from the main valve 42 through the lines 46 and 48 to the steering cylinder. Substantially simultaneously, the interrupter 64 stops or blocks hydraulic fluid flow along the auxiliary line 52 to the secondary valve 54. Thus, it should be appreciated that steering control through the operator controlled steering wheel 44 overrides sensor responsive steering control for maximum safety as well as flexibility of system operation.

Flow control valves 66 are also provided in the lines 58 of the control circuit 30 leading from the secondary valve 54. These flow control valves 66 are manually adjusted to meter the fluid flow rate from the secondary valve 54 to the steering cylinder 32. In this way, the valves 66 control the sensitivity or response rate of the sensor responsive self steering system. For example, where the valves 66 are adjusted to allow a relatively fast rate of flow, the piston rod 60 of the steering cylinder 32 is moved relatively rapidly to quickly turn the front wheels 36 of the harvester H in response to the sensors 20. Conversely, where the valves 66 are adjusted to allow relatively slower flow, steering response is desensitized and the wheels 36 are turned more slowly.

Advantageously, by varying the sensitivity hydraulically through operation of the flow control valves 66, the hydraulic or electrical power operating the secondary valve 54 does not need to be varied. Thus, the secondary valve 54 may be operated at full power at all times thereby assuring smooth, rapid operation. Further, more dependable and reliable performance is provided since full power operation substantially prevents any possibility of the secondary valve 54 sticking in position.

The guidance control system 10 of the present invention also eliminates the wander problem prevalent in prior art self steering devices. The guidance control system 10 achieves this result by incorporating a structure substantially preventing overcompensation by the self steering mechanism, which structure will now be described in detail.

More specifically, the control system 10 includes a tie rod assembly generally designated by reference numeral 68 for connecting the guide assembly 12 to the steering linkage 34. As shown in FIG. 2, the tie rod assembly 68 includes a slip rod 70. The slip rod 70 has a proximal end pivotally mounted to the steering linkage 34 by means of a pin 72. The tie rod assembly 68 also includes a hollow tube member 74. The tube member 74 has one end pivotally mounted to a lug on the guide assembly 12 by means of a pin 76. The opposite end of the tube member 74 is slidably received over the distal end of the slip rod 70.

A coil spring 78 is received around the slip rod 70. The spring 78 is fixed at one end adjacent the proximal end of the slip rod 70 and at the other end to the end of the tube member 74 received over the slip rod. Thus, it should be appreciated that the tie rod assembly 68 is biased in both tension and compression.

The force of the spring 78 is greater than the force of the springs 26 biasing the feeler elements 22. Thus, when either of the feeler elements 22 engages a stalk T as the harvester H moves along a row, that feeler element is pivoted to the steering adjustment actuating position while the guide assembly 12 is substantially maintained in position. Thus, proper operation of the sensor responsive steering to initiate a steering correction is assured.

As previously discussed above, when, for example, the left feeler element 22 closes its associated microswitch 28, the steering actuator 32 drives the linkage 34 to turn the wheels 36 to the left. This serves to bring the harvester H back into proper alignment to follow the plant row being harvested. As the wheels 36 turn to the left, the guide assembly 12 is also pivoted to the left.

This is because of the connection of the guide assembly 12 to the steering linkage 34 by means of the tie rod assembly 68.

With the pivoting of the guide assembly 12 to the left, it should be appreciated that the left feeler element 22 is more rapidly moved from the side of the engaging stalk T than if the assembly did not pivot. Since the feeler element 22 is brought out of engagement sooner, the element is faster to return to the rest position under the force of the spring 26. Thus, the associated microswitch 28 is opened sooner and the steering response time to each input of the feeler elements 22 is shortened. Advantageously, the shortened response time makes it less likely that the harvester H will be directed too far to the left necessitating an additional recorrection to the right. Since the tie rod assembly 68 is biased in both tension (during a turn to the right) and compression (during a turn to the left), this system operates substantially the same way when the right feeler element 22 engages a stalk T. Thus, wander back and forth across the row is reduced or eliminated.

In summary, numerous benefits have been described which result from employing the concepts of the present invention. Advantageously, the guidance control system 10 of the present invention allows override of the sensor responsive self-steering whenever the steering wheel control 44 is turned by the operator. Thus, maximum safety in operation is assured. Further, by controlling the sensitivity of the sensor responsive steering through flow control valves 66 in the hydraulic lines 58, more dependable and reliable performance is attained. This is because the hydraulic sensitivity control allows the operation of the solenoid of the secondary valve 54 at full power at all times thus preventing sticking of the valve and delays in steering corrections.

Advantageously, the guidance control system 10 also incorporates a tie rod assembly 68, biased in both tension and compression during steering, connecting the steering linkage 34 with the pivoting guide assembly 12. This system allows feedback from the steering linkage 34 to the guide assembly 12 that substantially prevents overcompensating steering corrections and thereby eliminates wander. Thus, the guidance system of the present invention allows more efficient and effective control of the harvester H during harvesting.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A guidance control system for a harvester or the like operative to maintain said harvester in proper alignment for harvesting plants from a row in a field, comprising:

a steering linkage mounted to said harvester;

at least one ground engaging wheel connected to said steering linkage;

an operator controlled steering means for steering said harvester;

a guide assembly pivotally mounted to said harvester including sensor means for sensing the position of plants being harvested;

a control circuit responsive to said sensor means to selectively impart movement to said steering linkage to steer said harvester along said row, said control circuit also including means for substantially simultaneously interrupting steering control through said sensor means when said operator controlled steering means in utilized by said operator; and means for subtantially preventing overcompensation by said sensor means responsive steering as said harvester is steered along the plant row, said overcompensation preventing means including means for connecting said guide assembly to said steering linkage whereby when said ground engaging wheel is turned by said sensor means responsive steering said guide assembly is also turned so as to pivot said sensor means away from said plant being sensed.

2. The guidance control system set forth in claim 1, wherein said guide assembly includes a pair of laterally spaced cooperating tines pivotally mounted to said harvester.

3. The guidance control system set forth in claim 2, wherein said sensor means includes a biased feeler element pivotally mounted to each tine, each feeler element being displaceable between a rest position and a steering adjustment actuating position when engaged by a plant being harvested.

4. The guidance control system set forth in claim 3, wherein a switch means is mounted to each tine in association with said feeler elements, each of said switch means being activated by said associated biased feeler element when displaced to said steering adjustment actuating position.

5. The guidance control system set forth in claim 1, further comprising a steering actuator for driving said steering linkage; said control circuit connected to said steering actuator including a main valve responsive to said operator controlled steering means and a secondary valve responsive to said sensor means.

6. The guidance control system set forth in claim 5, further comprising an auxiliary feed line leading from said main valve to said secondary valve; said interrupting means blocking flow through said auxiliary line when said operator controlled steering means is being utilized.

7. The guidance control system set forth in claim 6, further comprising main feed lines connecting said main valve to said steering actuator and secondary feed lines connecting said secondary valve to said steering actuator; said interrupting means blocking flow through main feed lines when said sensor responsive steering is being utilized.

8. The guidance control system set forth in claim 7, further comprising flow control valves in said secondary feed lines for adjusting sensitivity of said sensor responsive steering.

9. The guidance control system set forth in claim 1, wherein said connecting means is a tie rod assembly.

10. The guidance control system set fortn in claim 9, wherein said tie rod assembly includes a hollow tube member slidably received over a slip rod.

11. The guidance control system set forth in claim 10, wherein is provided means for biasing said tie rod assembly in tension and compression during turning.

12. The guidance control system set forth in claim 11, wherein said biasing means is a spring having one end fixed to said slip rod and an opposite end fixed to said hollow tube member.

13. The guidance control system set forth in claim 11, wherein said sensor means is displaceable between a rest position to which it is biased and a steering adjustment actuating position when engaged by a plant being harvested; said tie rod assembly biasing means producing a greater force than is biasing said sensor means so as to substantially prevent said guide assembly from pivoting when said sensor means is initially engaged by a plant whereby displacement of said sensor means to said steering adjustment actuating position is assured.

* * * * *